United States Patent
Bhattad et al.

(10) Patent No.: US 11,606,811 B2
(45) Date of Patent: Mar. 14, 2023

(54) TECHNIQUES FOR DETERMINING RESOURCES FOR COMMUNICATING OVER AN ACQUIRED CHANNEL

(71) Applicant: QUALCOMM Incorporated, San Diego, CA (US)

(72) Inventors: Kapil Bhattad, Bangalore (IN); Jing Sun, San Diego, CA (US); Xiaoxia Zhang, San Diego, CA (US); Ananta Narayanan Thyagarajan, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 259 days.

(21) Appl. No.: 16/998,744

(22) Filed: Aug. 20, 2020

(65) Prior Publication Data
US 2021/0068149 A1 Mar. 4, 2021

(30) Foreign Application Priority Data

Aug. 26, 2019 (IN) .............................. 201941034278

(51) Int. Cl.
*H04W 74/00* (2009.01)
*H04W 74/08* (2009.01)
*H04W 72/04* (2023.01)
*H04W 72/0446* (2023.01)

(52) U.S. Cl.
CPC ....... *H04W 74/006* (2013.01); *H04W 72/042* (2013.01); *H04W 72/0446* (2013.01); *H04W 72/0493* (2013.01); *H04W 74/0808* (2013.01)

(58) Field of Classification Search
CPC ............. H04W 74/006; H04W 72/042; H04W 72/0446; H04W 72/0493; H04W 74/0808
See application file for complete search history.

(56) References Cited

U.S. PATENT DOCUMENTS

| | | | |
|---|---|---|---|
| 2017/0245302 A1* | 8/2017 | Mukherjee | H04W 16/14 |
| 2017/0332358 A1* | 11/2017 | Park | H04W 72/1289 |
| 2018/0115347 A1* | 4/2018 | Yerramalli | H04W 72/0413 |
| 2018/0124749 A1* | 5/2018 | Park | H04W 72/14 |
| 2018/0227936 A1* | 8/2018 | Yerramalli | H04L 1/0067 |
| 2018/0343670 A1* | 11/2018 | Park | H04W 72/1289 |
| 2019/0253200 A1* | 8/2019 | Salem | H04W 72/042 |
| 2019/0313383 A1* | 10/2019 | Xiong | H04W 72/042 |
| 2020/0092861 A1* | 3/2020 | Xu | H04L 5/0091 |
| 2020/0092913 A1* | 3/2020 | Xu | H04L 5/0048 |
| 2020/0275430 A1* | 8/2020 | Salem | H04L 1/1614 |
| 2020/0314819 A1* | 10/2020 | Loehr | H04W 4/40 |

(Continued)

FOREIGN PATENT DOCUMENTS

WO 2019138149 A1 7/2019

OTHER PUBLICATIONS

International Search Report and Written Opinion—PCT/US2020/047508—ISA/EPO—dated Oct. 30, 2020.

*Primary Examiner* — Jael M Ulysse
(74) *Attorney, Agent, or Firm* — ArentFox Schiff LLP

(57) ABSTRACT

Aspects described herein relate to configuring communications over an acquired channel, where the configuration may indicate a set of resources used for communicating in at least one direction over the acquired channel. The set of resources may be based on a set of possible starting points within a slot for transmitting the communications.

30 Claims, 12 Drawing Sheets

(56) References Cited

U.S. PATENT DOCUMENTS

| | | | |
|---|---|---|---|
| 2020/0337072 A1* | 10/2020 | Lunttila | H04W 72/1268 |
| 2021/0007149 A1* | 1/2021 | Li | H04W 74/0833 |
| 2021/0051712 A1* | 2/2021 | Hedayat | H04W 16/14 |
| 2021/0068135 A1* | 3/2021 | Shah | H04W 52/0216 |
| 2021/0168849 A1* | 6/2021 | Oh | H04L 5/0053 |
| 2021/0282188 A1* | 9/2021 | Cui | H04W 74/0816 |
| 2021/0328728 A1* | 10/2021 | El Hamss | H04L 5/0091 |
| 2021/0344451 A1* | 11/2021 | Hedayat | H04L 1/1861 |
| 2022/0167423 A1* | 5/2022 | Aldana | H04W 74/004 |

\* cited by examiner

TECHNIQUES FOR DETERMINING RESOURCES FOR COMMUNICATING OVER AN ACQUIRED CHANNEL

CLAIM OF PRIORITY UNDER 35 U.S.C. § 119

The present application for patent claims priority to Indian Patent Application No. 201941034278, entitled "TECHNIQUES FOR DETERMINING RESOURCES FOR COMMUNICATING OVER AN ACQUIRED CHANNEL" filed Aug. 26, 2019, which is assigned to the assignee hereof and hereby expressly incorporated by reference herein for all purposes.

BACKGROUND

Aspects of the present disclosure relate generally to wireless communication systems, and more particularly, to communicating over resources of an acquired channel.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, a user equipment (UE) can acquire a channel, such as by using listen-before-talk (LBT) or other channel assessment procedures for the channel, receiving a configured grant from a base station, and/or the like. The UE, however, may not always know ahead of time when it acquires the channel for transmitting within a slot.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for wireless communication is provided. The method includes receiving, from a node in a first direction and during a first occasion, control information including an indication of a set of resources available to use for transmitting communications in a second direction and during a second occasion while the node has acquired a channel, receiving an updated set of resources available to use for transmitting communications in the second direction and during the second occasion while the node has acquired the channel, and transmitting, in the set of resources based on receiving the control information or in the updated set of resources based on receiving the updated set of resources, communications to one or more nodes in the second direction.

In another example, a method for wireless communication is provided. The method includes acquiring a channel for transmitting communications in a first direction, generating control information including an indication of a set of resources available to use for transmitting communications in a second direction while the channel is acquired, and transmitting the control information in a first occasion while the channel is acquired.

In another example, a method for wireless communication is provided that includes receiving a starting indication of a set of possible starting points within a slot for transmitting uplink communications, detecting acquisition of a channel for transmitting uplink communications at a starting point in the set of possible starting points, selecting a set of resources to use for transmitting a data packet within the slot, and transmitting the data packet to a base station on the selected set of resources.

In another example, a method for wireless communications includes preparing, for each of a set of possible starting points for uplink communications within a slot, multiple instances of the uplink communications, and transmitting, based on a second one of the set of possible starting points, one of the multiple instances of the uplink communications as prepared based on a first one of the set of possible starting points.

In another example, a method for wireless communication includes receiving uplink control information (UCI) including an indication of a set of resources used for transmitting uplink communications within a mini-slot, receiving uplink communications within the mini-slot, and processing a data packet of the uplink communications based on the indication of the set of resources.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

For example, an apparatus for wireless communication is provided that includes a transceiver, a memory configured to store instructions, and one or more processors communicatively coupled with the transceiver and the memory. The one or more processors are configured to receive, from a node in a first direction and during a first occasion, control information including an indication of a set of resources available to use for transmitting communications in a second direction and during a second occasion while the node has acquired a channel, receive an updated set of resources available to use for transmitting communications in the second direction and during the second occasion while the node has acquired the channel, and transmit, in the set of resources based on receiving the control information or in the updated set of resources based on receiving the updated set of resources, communications to one or more nodes in the second direction.

In another example, an apparatus for wireless communication is provided. The apparatus includes a transceiver, a memory configured to store instructions, and one or more processors communicatively coupled with the transceiver and the memory. The one or more processors are configured to acquire a channel for transmitting communications in a first direction, generate control information including an indication of a set of resources available to use for transmitting communications in a second direction while the channel is acquired, and transmit the control information in a first occasion while the channel is acquired.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
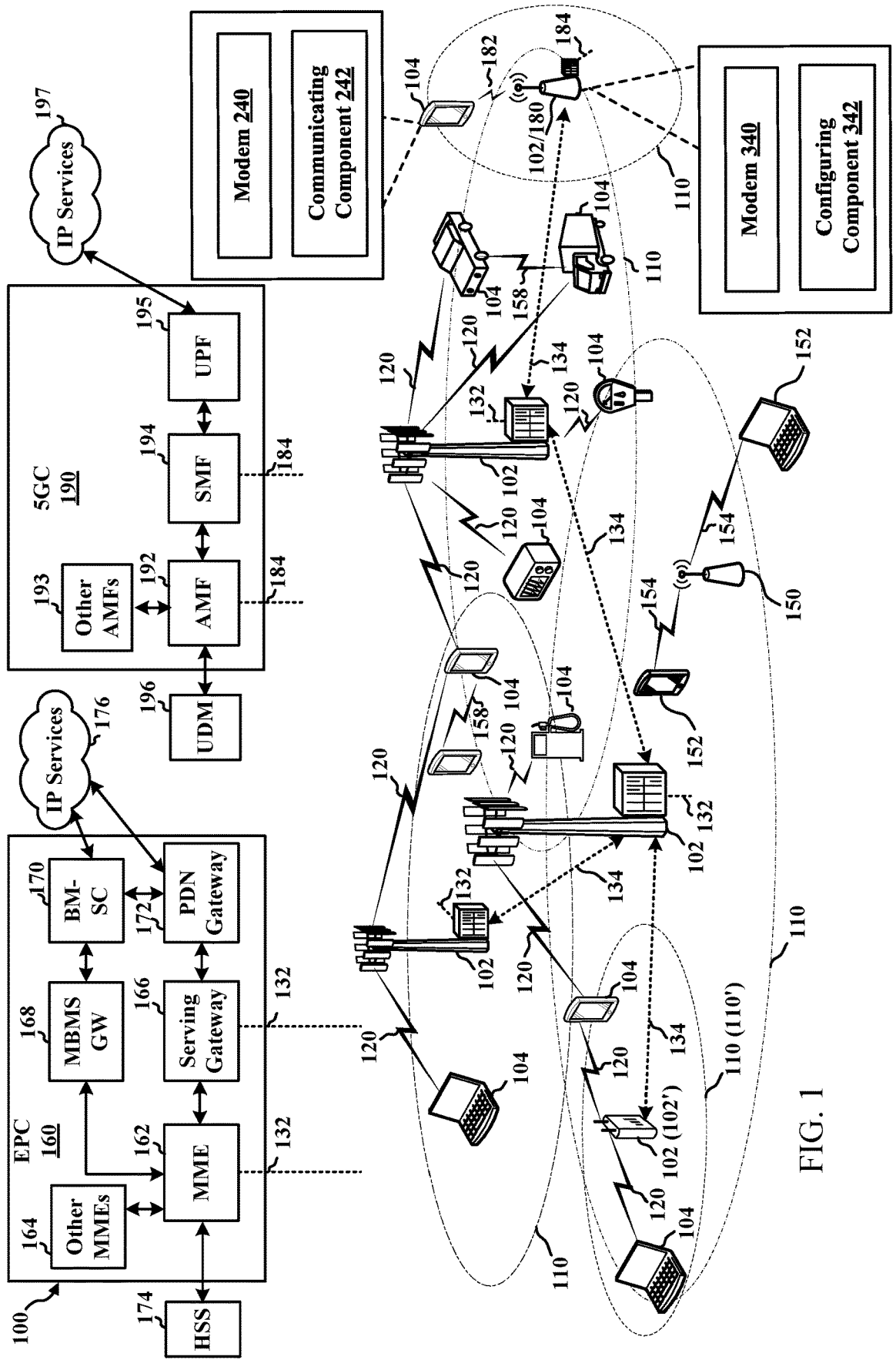
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to communicating based on acquiring a channel in a wireless network. In one example, based on acquiring a channel, a first node that transmits over the channel can indicate to a second node that receives the communications a portion of resources that can be used by the second node, while the channel is acquired, to transmit communications to the first node (or other nodes). In one example, as the first node continues transmitting over the acquired channel, it may update the portion of resources that may be used by the second node (e.g., to increase the size of resources as the first node is finishing transmission and perhaps does not utilize all of the resources). For example, the size of resources can correspond to a number of slots related to the acquired channel, a number of symbols within one or more slots, etc. For example, the first node can be a user equipment (UE) that indicates, to a base station, the portion of resources for downlink communications. In another example, the first node can be a base station that indicates, to a UE, the portion of resources for uplink communications.

In another example, a user equipment (UE) can indicate, in uplink control information (UCI), a size of resources used for transmitting uplink communications. For example, the size of resources can correspond to a number of symbols (e.g., orthogonal frequency division multiplexing (OFDM), single-carrier frequency division multiplexing (SC-FDM), etc. symbols) within a slot or mini-slot. For example, a mini-slot can correspond to a number of symbols within the slot that comprise the mini-slot. In some wireless communication technologies, a slot can be partitioned into multiple mini-slots, where each mini-slot can include a number of symbols (e.g., consecutive symbols) in the slot, and communications can occur within the mini-slot. In this regard, a mini-slot may have its own control region for transmitting control information for the mini-slot, demodulation reference signal (DM-RS) resources, hybrid automatic repeat/request (HARD) mechanism, etc.

Given multiple possible transmission starting points in a slot (e.g., a subset of symbols in the slot), a UE can possibly start transmitting at a symbol (e.g., a first symbol of a mini-slot) within a slot, depending on when the channel is acquired. In an example, a set of possible starting points can be configured by the base station, which may be based on a capability indicated by the UE. In addition, in an example, the UE can concurrently prepare uplink communications based on multiple possible starting points within a slot (and/or multiple possible sizes for the uplink communications, which may be based on the starting points and a corresponding last symbol in the slot). In other examples, the UE can indicate capabilities for a number of uplink communications that can be transmitted or prepared, a number of uplink symbols per slot that can be used to transmit the uplink communications, a number of overlapping physical uplink shared channels (PUSCHs) that it can handle (or prepare) to account for uncertainty in LBT outcome, preparation time for preparing the uplink communications, etc. In any case, the base station can indicate the set of possible starting symbols based at least in part on the capabilities of the UE. Moreover, in some examples, an uplink communication prepared based on one starting symbol can be transmitted based on a different starting symbol where the waveform for the uplink communications is created to be position independent, as further described herein (e.g., as having a position independent demodulation reference signal (DMRS)/scrambling, data/scrambling, UCI multiplexing, etc.). In any case, efficiency of channel acquisition based communications can be improved in this regard.

The described features will be presented in more detail below with reference to FIGS. 1-12.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for indicating resources related to transmitting over an acquired channel. In addition, some nodes may have a modem 340 and configuring component 342 for possibly configuring a UE to communicate based on acquiring a channel and/or configuring downlink communications based on resources indicated by a UE, as described herein. Though a UE 104 is shown as having the modem 240 and communicating component 242 and a base station 102/gNB 180 is shown as having the modem 340 and configuring component 342, this is one illustrative example, and substantially any node or type of node may include a modem 240 and communicating component 242 and/or a modem 340 and configuring component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 242 of a UE 104 can acquire a channel and can indicate a portion of resources of an acquired channel that can be used for downlink communications in channel occupancy time (COT) sharing. In this example, a base station 102 can use the portion of resources for the downlink communications, which can be based on the configuring component 342 configuring the portion of resources based on the indication received from the UE 104. In another example, communicating component 242 of the UE 104 can determine a starting point within a slot and/or a size for transmitting uplink communications. In one example, communicating component 242 can concurrently prepare uplink communications for transmitting within a portion of the slot based on a determined starting point. In one example, configuring component 342 can configure the UE 104 with a set of possible starting locations, which may be based on one or more indicated capabilities of the UE 104.

Turning now to FIGS. 2-12, aspects are depicted with reference to one or more components and one or more methods that may perform the actions or operations described herein, where aspects in dashed line may be optional. Although the operations described below in FIGS. 4, 5, 7, 8, and 11 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Figure 2:
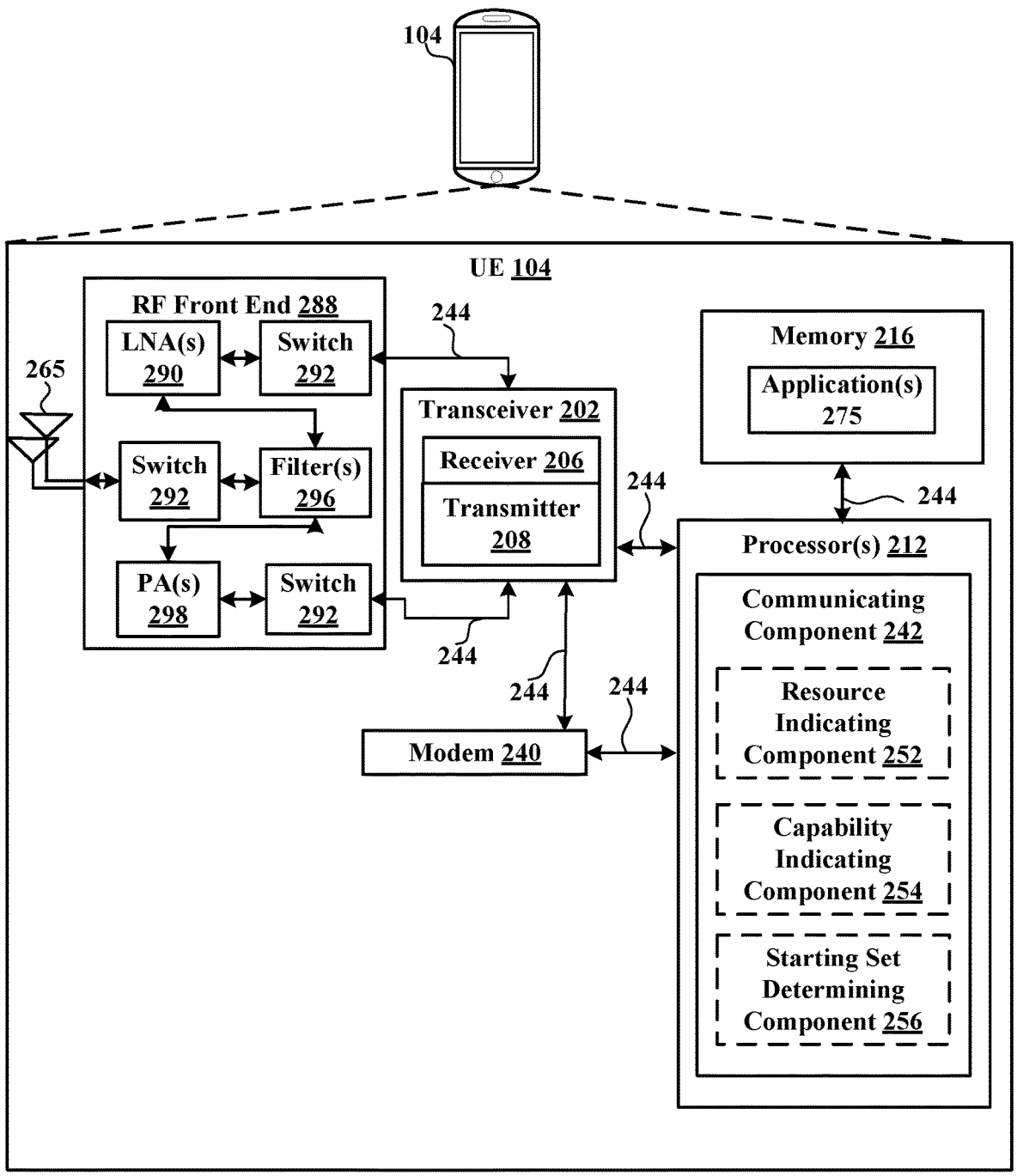
FIG. 2 is a block diagram illustrating an example of a UE, in accordance with various aspects of the present disclosure.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for communicating over resources of an acquired channel in accordance with aspects described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a resource indicating component 252 for indicating a set of resources over which communications in a first direction (e.g., uplink communications) are to be transmitted and/or a set of resources over which communications in a second direction (e.g., downlink communications) can be transmitted, a capability indicating component 254 for indicating one or more capabilities with respect to preparing communications in the first direction for transmission and/or transmitting concurrent or overlapping communications in the first direction, and/or a starting set determining component 256 for determining a set of possible starting points within a slot for transmitting communications in the first direction.

In an aspect, the processor(s) 212 may correspond to one or more of the processors described in connection with the UE in FIG. 12. Similarly, the memory 216 may correspond to the memory described in connection with the UE in FIG. 12.

Figure 3:
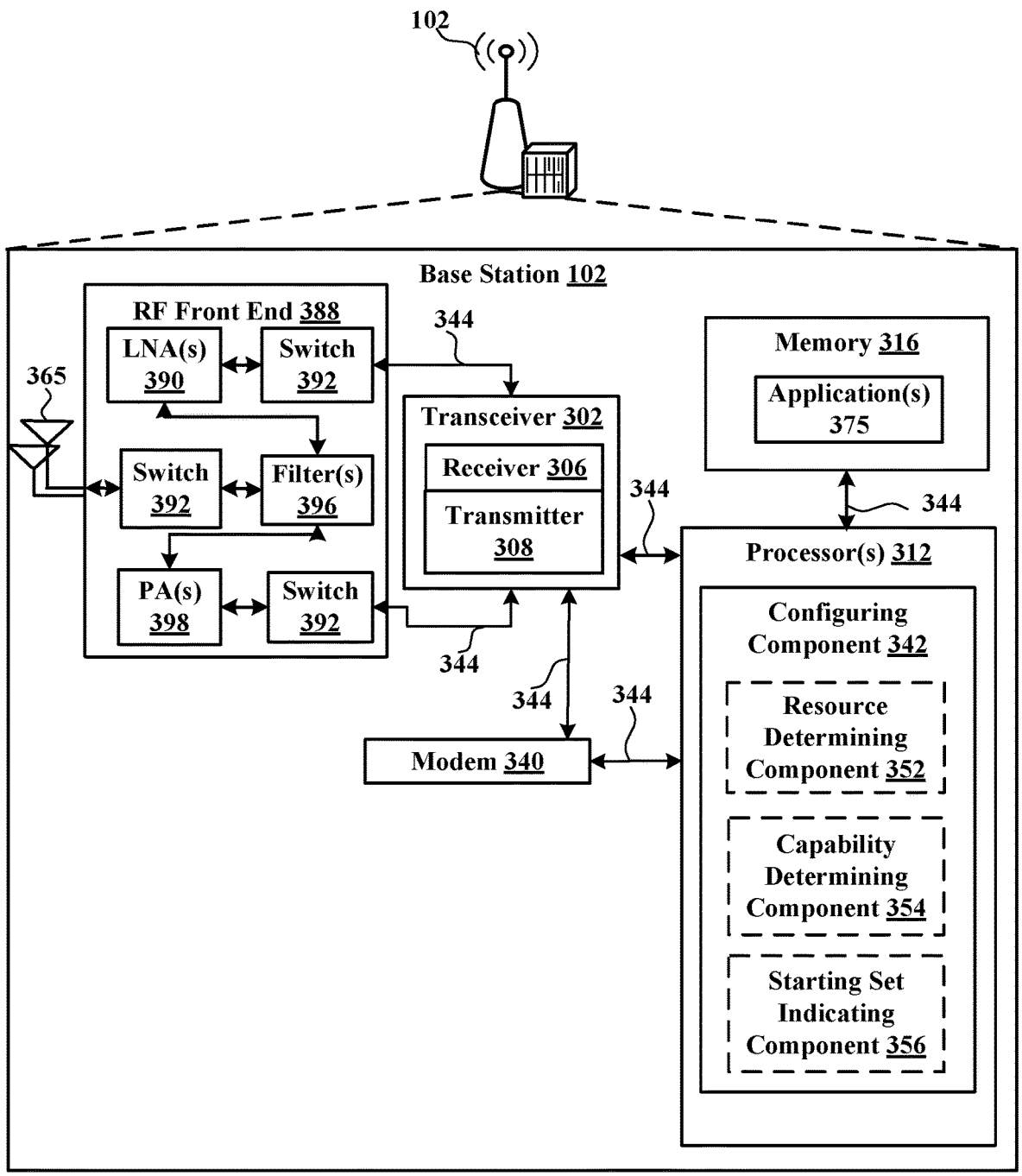
FIG. 3 is a block diagram illustrating an example of a base station, in accordance with various aspects of the present disclosure.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and configuring component 342 for configuring a UE 104 to transmit over resources of an acquired channel.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, configuring component 342 can optionally include a resource determining component 352 for determining a set of resources over which communications in a second direction (e.g., downlink communications) can be transmitted and/or a set of resources over which communications in a first direction (e.g., uplink communications) are to be transmitted, a capability determining component 354 for determining one or more capabilities of a UE with respect to preparing communications for transmission in the first direction and/or transmitting concurrent or overlapping communications in the first direction, and/or a starting set indicating component 356 for indicating a set of possible starting points within a slot for transmitting communications in the first direction.

In an aspect, the processor(s) 312 may correspond to one or more of the processors described in connection with the base station in FIG. 12. Similarly, the memory 316 may correspond to the memory described in connection with the base station in FIG. 12.

Figure 4:
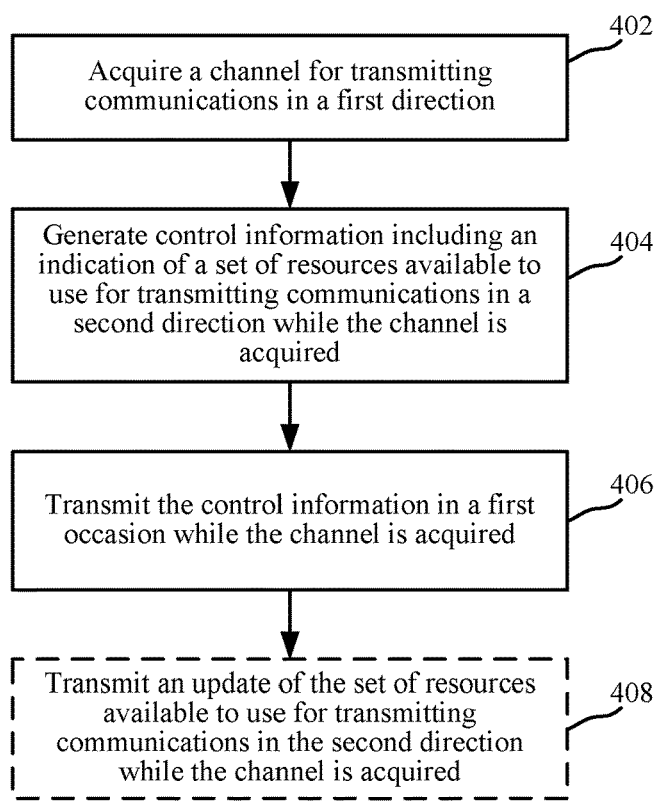
FIG. 4 is a flow chart illustrating an example of a method for indicating resources for transmitting communications, in accordance with various aspects of the present disclosure.
Figure 5:
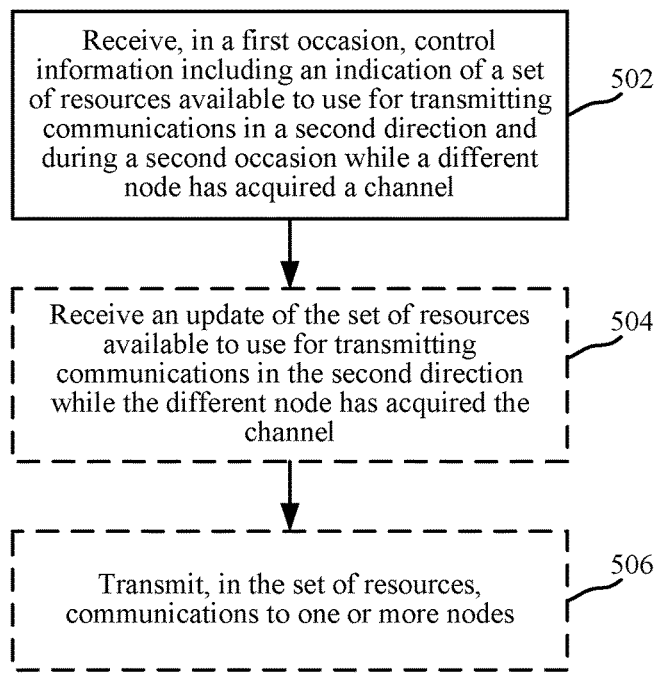
FIG. 5 is a flow chart illustrating an example of a method for receiving an indication of resources for transmitting communications, in accordance with various aspects of the present disclosure.

FIG. 4 illustrates a flow chart of an example of a method 400 for indicating resources available for use in COT sharing. FIG. 5 illustrates a flow chart of an example of a method 500 for receiving an indication of resources available for use in COT sharing. Methods 400 and 500 are described in conjunction with one another for ease of explanation, though the methods 400 and 500 are not required to be performed in conjunction. In an example, as described below, a UE 104 can perform the functions described in method 400 using one or more of the components described in FIGS. 1 and 2 and/or a base station 102 and/or other network component can perform the functions described in method 500 using one or more of the components described in FIGS. 1 and 3. In another example, a base station 102 and/or other network component can perform the functions described in method 400 using one or more of the components described for the UE 104 in FIGS. 1 and 2 and/or a UE 104 can perform the functions described in method 500 using one or more of the components described for the base station 102 in FIGS. 1 and 3.

In method 400, at Block 402, a channel for transmitting communications in a first direction can be acquired. In an aspect, communicating component 242, e.g., in conjunction with processor(s) 212, memory 216, transceiver 202, etc., can acquire the channel for transmitting communications in the first direction. For example, where communicating component 242 is within a UE 104, the first direction can be an uplink direction for transmitting communications from the UE 104. In another example, where communicating component 242 is within a base station 102, the first direction can be a downlink direction for transmitting communications from the base station 102. In an example, acquiring the channel can include performing a listen-before-talk (LBT) or other clear channel assessment (CCA) procedure to determine when a channel or related resources are or become available, and/or transmitting an indication that the device is acquiring the available channel. Thus, in an example, communicating component 242 can perform the LBT procedure periodically until the channel is acquired in a period of time (e.g., at the beginning of one or more slots, min-slots, symbols, etc.).

In method 400, at Block 404, control information can be generated including an indication of a set of resources available to use for transmitting communications in a second direction while the channel is acquired. In an aspect, resource indicating component 252, e.g., in conjunction with processor(s) 212, memory 216, transceiver 202, communicating component 242, etc., can generate the control information including the indication of the set of resources available to use for transmitting communications in the second direction while the channel is acquired. For example, where communicating component 242 is within a UE 104, the second direction can be a downlink direction for transmitting communications from the base station 102. In another example, where communicating component 242 is within a base station 102, the second direction can be an uplink direction for transmitting communications from the UE 104. For example, resource selecting component 252 can determine the set of resources based on an amount of resources to be used for transmitting the communications in the first direction. In addition, as described further herein, as the communications are transmitted in the first direction, the resources that can be used for transmitting in the second direction can be updated (e.g., increased).

In method 400, at Block 406, the control information can be transmitted in a first occasion while the channel is acquired. In an aspect, resource indicating component 252, e.g., in conjunction with processor(s) 212, memory 216, transceiver 202, communicating component 242, etc., can transmit the control information in the first occasion while the channel is acquired. For example, where communicating component 242 is within a UE 104, resource indicating component 252 can transmit the control information in uplink control information (UCI) in a first occasion for transmitting a physical uplink shared channel (PUSCH). For example, where communicating component 242 is within a base station 102, resource indicating component 252 can transmit the control information in downlink control information (DCI) in a first occasion for transmitting a physical downlink shared channel (PDSCH). A receiving node can receive the control information and can determine the set of resources for transmitting in the second direction. An example is shown in FIG. 6.

Figure 6:
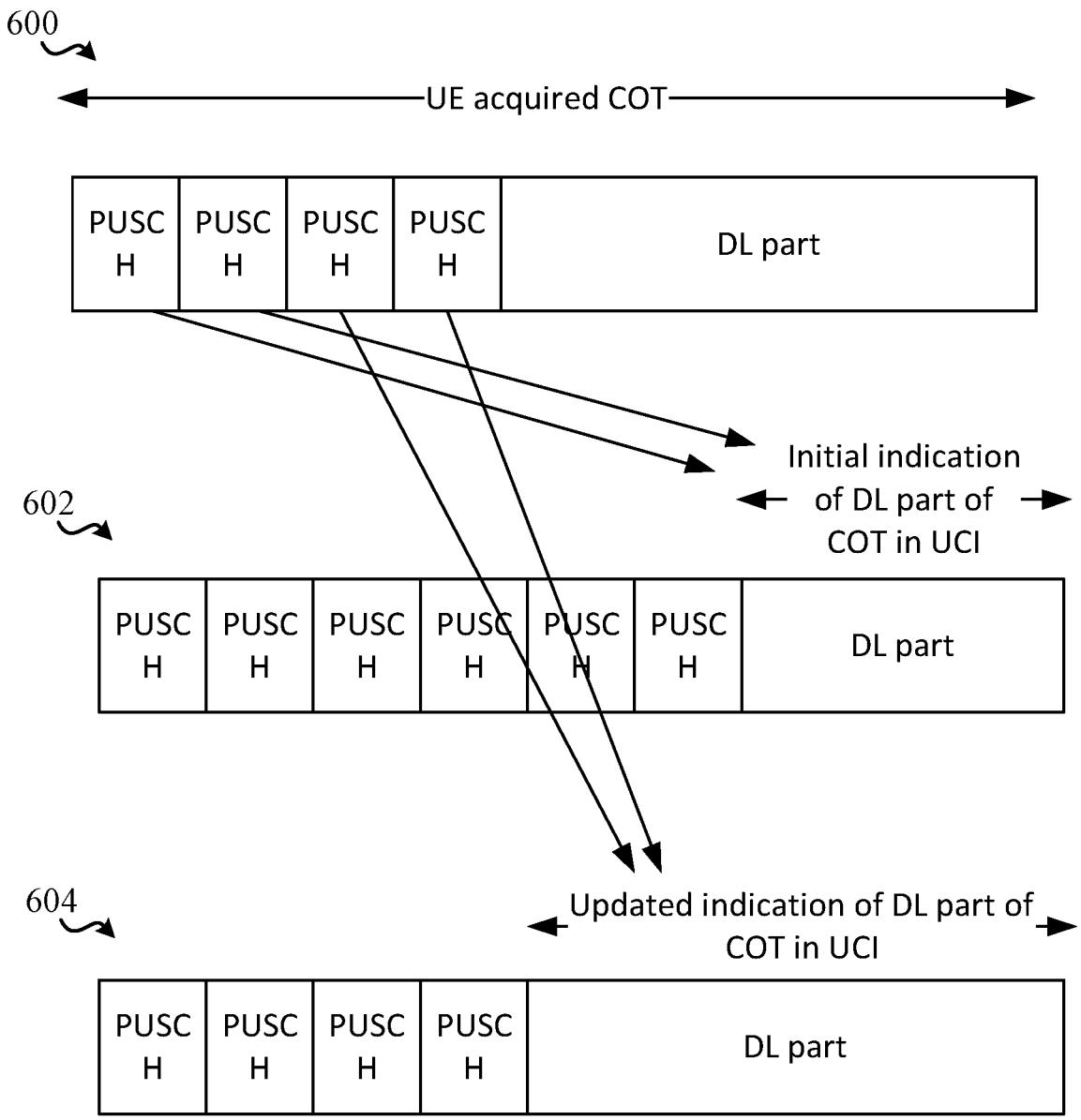
FIG. 6 illustrates an example of a resource allocation for indicating resources for transmitting communications, in accordance with various aspects of the present disclosure.

FIG. 6 illustrates examples of resource allocations 600, 602, 604 with varying resources allocated for PUSCH and downlink (e.g., where communicating component 242 is within a UE 104, the first direction is uplink, and the second direction is downlink). In resource allocation 600, the UE 104 can acquire the channel and can transmit PUSCH where the first two PUSCH symbols can include UCI including an initial indication of a downlink part for COT sharing, as represented by resource allocation 602. In this example, the base station can receive the PUSCH from the UE 104 and can determine the downlink part at the end of the channel, as indicated by the UCI in the PUSCH, that can be used to transmit downlink communications.

In method 500, at Block 502, control information can be received in a first occasion, including an indication of a set of resources available to use for transmitting communications in a second direction and during a second occasion while a different node has acquired a channel. In an aspect, resource determining component 352, e.g., in conjunction with processor(s) 312, memory 316, transceiver 302, configuring component 342, etc., can receive, in a first occasion, control information including an indication of a set of resources available to use for transmitting communications in a second direction and during a second occasion while a different node has acquired a channel. For example, resource determining component 352 can receive the control information in a first direction (e.g., uplink) and may receive the control information from the different node that has acquired the channel (e.g., UE 104). In an example, the control information can include UCI from a UE 104 that indicates PDSCH resources over which the base station 102 can transmit PDSCH during the second occasion. For example, the UCI can indicate one or more parameters for determining the second occasion and/or related resources, such as one or more symbols or symbol offsets for the second occasion (e.g., the DL part in resource allocation 602). In this regard, the UE 104 (e.g., the different node) has acquired the channel and can share the resources with the base station 102 by allowing the base station 102 to transmit the DL part during the COT.

In method 400, optionally at Block 408, an update of the set of resources available to use for transmitting communications in the second direction while the channel is acquired can be transmitted. In an aspect, resource indicating component 252, e.g., in conjunction with processor(s) 212, memory 216, transceiver 202, communicating component 242, etc., can transmit an update of the set of resources available to use for transmitting communications in the second direction while the channel is acquired. For example, where communicating component 242 is within a UE 104, resource indicating component 252 can transmit the update in a subsequent occasion for transmitting the PUSCH. For example, where communicating component 242 is within a base station 102, resource indicating component 252 can transmit the control information in a subsequent occasion for transmitting the PDSCH. A receiving node can receive the update and can determine the updated set of resources for transmitting in the second direction.

Referring again to FIG. 6, in resource allocation 600, the UE 104 can transmit an update of the set of resources in UCI in the second pair of PUSCH symbols, which include an updated indication of the downlink part for COT sharing, as represented by resource allocation 604. In this example, the base station can receive the update from the UE 104 and can determine an increase in resources for the downlink part at the end of the channel, as indicated by the UCI in the second pair of PUSCH symbols, that can be used to transmit downlink communications.

In a specific example, when UE shares COT with gNB it can indicate which parts can be used for downlink (DL) (e.g., time offset from UCI, duration of DL part etc.). Indicating this from the very first UCI may limit UE scheduling flexibility (e.g., if a UE does not know how many uplink (UL) slots it has data for, it may not be able to tell exactly where gNB can start DL). Initially, the UE can indicate no DL or be conservative about DL slots it allocates, but the UE can later indicate DL is allowed and/or give more DL slots to gNB. As shown in resource allocation 600, 602, 604, and as explained above, for example, the UE can indicate some DL portions in initial UCI (e.g., UCI of a configured grant PUSCH (CG-UCI)) but it can update it in subsequent CG-UCI. For example, CG-UCI can refer to UCI transmitted over CG resources, where the CG resources can be configured by radio resource control (RRC) signaling and/or dynamically activated via a dynamic grant. In another example, as the gNB may detect the initial transmitted CG-UCI but not the subsequent one, UE may be allowed to increase the DL assignment, but perhaps not decrease it (e.g., the UE may not be able to change a part it marked as DL to UL). In addition, where the gNB does not detect the later update, it may only use the parts indicated as DL in the initial CG-UCI for DL. gNB that detects the updated UCI could use the expanded part. In yet another example, gNB sharing its COT with UE can update parts it marked as DL (increase the UL part, not decrease) to avoid issues with UE not detecting later updates. In these and other examples, for UE initiated COT, UE can decide to end earlier for UL.

In method 500, optionally at Block 504, an update of the set of resources available to use for transmitting communications in the second direction while the different node has acquired the channel can be received. In an aspect, resource determining component 352, e.g., in conjunction with processor(s) 312, memory 316, transceiver 302, configuring component 342, etc., can receive the update of the set of resources available to use for transmitting communications in the second direction while the different node has acquired the channel. For example, resource determining component 352 can receive the update from the UE 104 in additional control information (e.g., UCI) or as a resource grant or other indication. The update can be received after the initial control information indicating the set of resources and can modify the set of resources. For example, as shown in FIG. 6, the update can indicate an updated set of resources, such as the DL part in resource allocation 604, which can include the set of resources in the initial indicate of DL part in resource allocation 602 in addition to other symbols preceding the DL part in resource allocation 602. As described, it can be expected that the update to the set of resources is only to increase the set of resources, and not decrease the set of resources. In this regard, in an example, if the update decreases the set of resources, resource determining component 352 can discard or otherwise ignore the received update, and may transmit downlink communications over the set of resources initially indicated in the control information received at Block 502.

In method 500, optionally at Block 506, communications can be transmitted to one or more nodes in the set of resources. In an aspect, configuring component 342, e.g., in conjunction with processor(s) 312, memory 316, transceiver 302, etc., can transmit, in the set of resources (e.g., as received in the initial control information at Block 502 or as updated at Block 504), communications to one or more nodes. Thus, for example, configuring component 342 can transmit downlink communications in the DL part indicated in the control information (e.g., DL part of resource allocation 602), and/or in the DL part as updated (e.g., DL part of resource allocation 604), based on whether the updated set of resources is received in the update or not.

As explained above, these concepts can be applied to UE 104 and base station 102 alike, such that, in one example, the base station 102 can perform method 400 for acquiring the channel, generating control information (e.g., DCI) indicating a set of resources in the COT for the base station 102 that can be used for uplink communications from the UE 104, and transmitting the control information and/or an update thereto to the UE 104. Similarly, in this example, the UE 104 can perform method 500 for receiving the control information from the base station 102 indicating the set of resources during the COT of the base station 102 over which the UE 104 can transmit uplink communications, receiving an update of the set of resources, and/or transmitting uplink communications over the set of resources.

Figure 7:
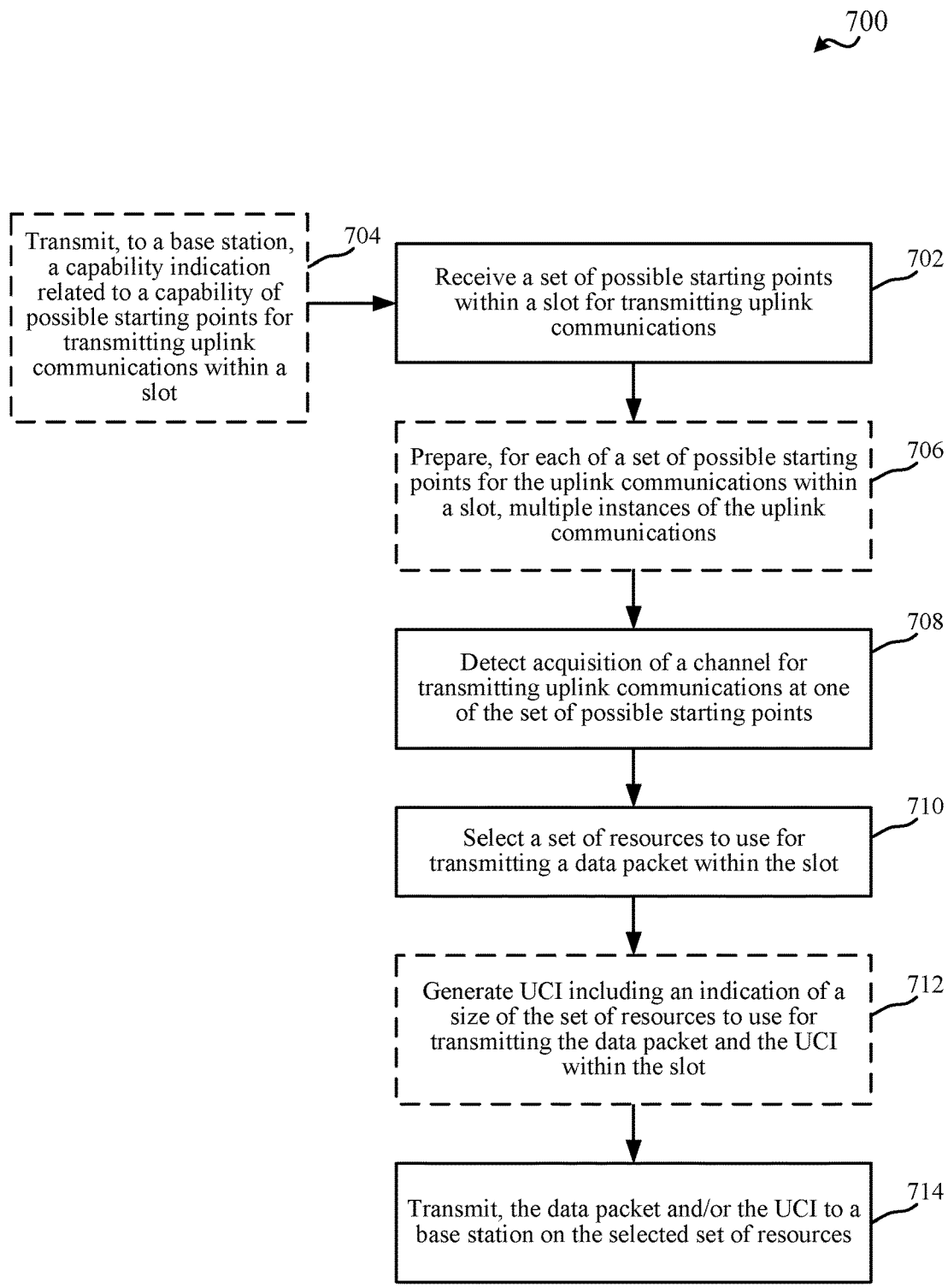
FIG. 7 is a flow chart illustrating an example of a method for transmitting over selected resources of an acquired channel, in accordance with various aspects of the present disclosure.
Figure 8:
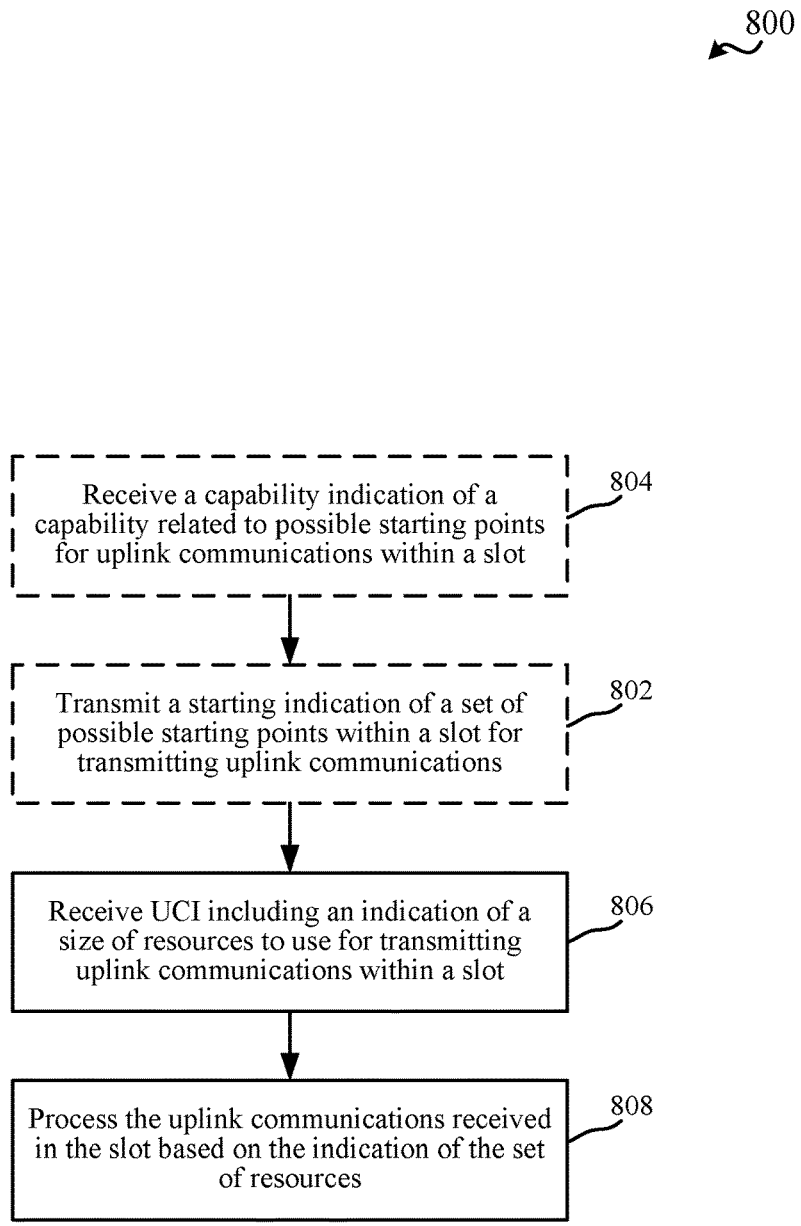
FIG. 8 is a flow chart illustrating an example of a method for configuring transmission over selected resources of an acquired channel, in accordance with various aspects of the present disclosure.

FIG. 7 illustrates a flow chart of an example of a method 700 for a UE selecting resources to use for transmitting data packets in a slot in uplink communications. FIG. 8 illustrates a flow chart of an example of a method 800 for a BS for configuring a UE to select resources to use for transmitting data packets in a slot in uplink communications. Methods 700 and 800 are described in conjunction with one another for ease of explanation, though the methods 700 and 800 are not required to be performed in conjunction. In an example, a UE 104 can perform the functions described in method 700 using one or more of the components described in FIGS. 1 and 2 and/or a base station 102 and/or other network component can perform the functions described in method 800 using one or more of the components described in FIGS. 1 and 3.

In method 700, at Block 702, a set of possible starting points within a slot for transmitting uplink communications can be determined. In an aspect, starting set determining component 256, e.g., in conjunction with processor(s) 212, memory 216, transceiver 202, communicating component 242 etc., can receive the set of possible starting points within the slot for transmitting uplink communications. For example, starting set determining component 256 can receive the set of possible starting points from a base station 102 (e.g., in a configuration) or may determine the set of possible starting points based on one or more parameters.

In method 800, optionally at Block 802, a starting indication of a set of possible starting points within a slot for transmitting uplink communications can be transmitted. In an aspect, starting set indicating component 356, e.g., in conjunction with processor(s) 312, memory 316, transceiver 302, configuring component 342 etc., can transmit the starting indication of the set of possible starting points within the slot for transmitting uplink communications. In this example, starting set indicating component 356 can transmit the set of possible starting points to the UE 104 and/or starting set determining component 256 can receive the set of possible starting points from the base station 102. For example, starting set indicating component 356 can transmit an indication of the set of possible starting points in a configuration message or parameter in RRC signaling, in DCI, or in other signaling to the UE 104.

For example, the set of possible starting points can correspond to starting symbols of one or more mini-slots defined within the slot, and/or the indication may indicate an index of the symbol within the mini-slot, and index of the mini-slot within the slot, and/or the like. In this example, the base station 102 can also configure one or more slots to include one or more mini-slots within the one or more slots, as described, where the mini-slots can include collections of symbols (e.g., consecutive symbols) within the slots. The UE 104 can be capable of supporting mini-slot communications, full slot communications starting from one or more mini-slots (which may include a capability to concurrently prepare uplink communications for each possible transmission length from different possible starting points in the slot until end of the slot), and/or a mix of mini-slot and concurrent preparation of uplink communications until end of the slot. Specific non-limiting examples are illustrated in FIG. 9.

Figure 9:
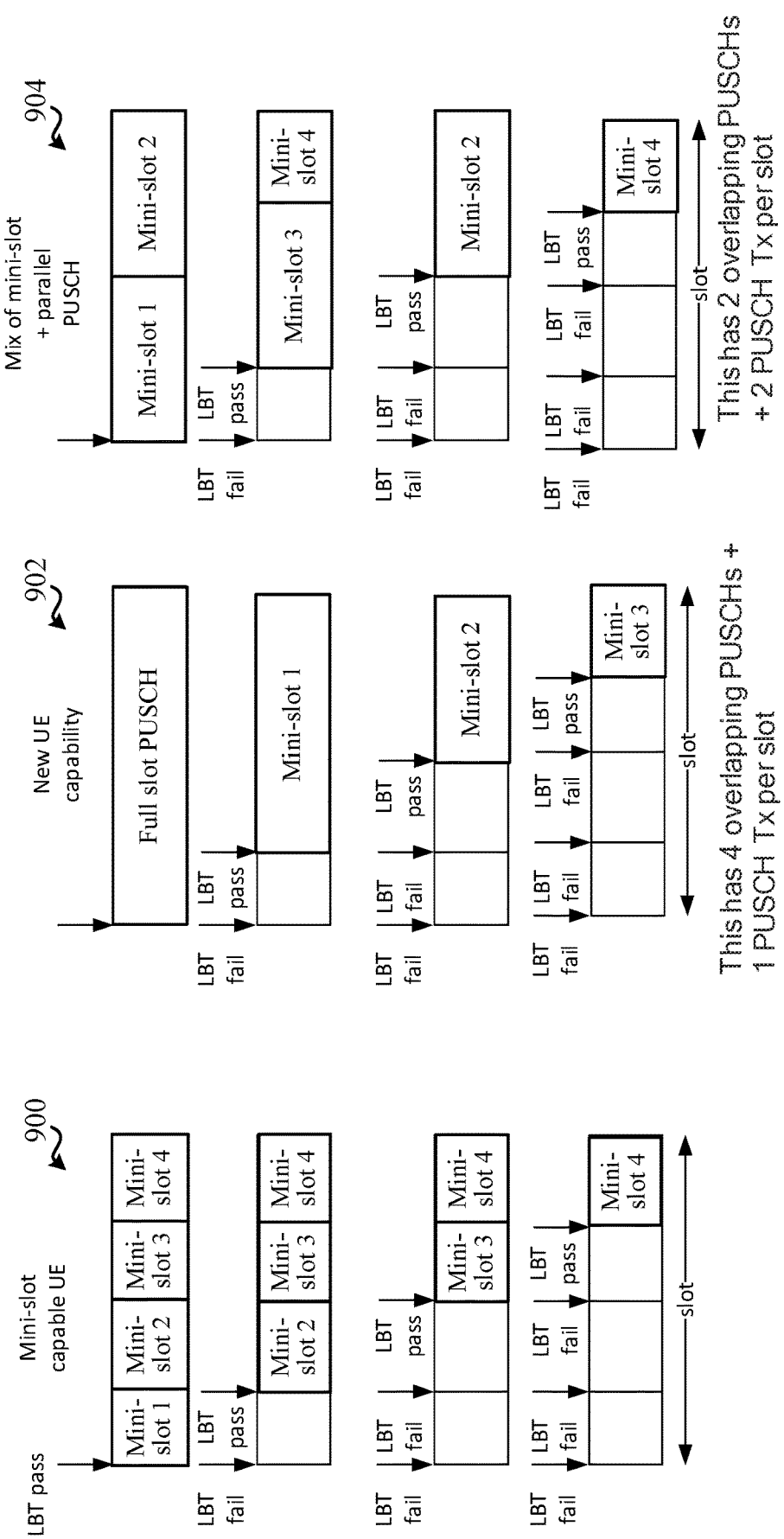
FIG. 9 illustrates an example of resource allocations for mini-slot, full slot with parallel communication processing, and a mix of mini-slot and parallel communication processing, in accordance with various aspects of the present disclosure.

FIG. 9 illustrates examples of resource allocations 900, 902, 904 of a UE transmitting in one or more mini-slots. In one example, the set of possible starting symbols can include the starting symbol of each of one or more mini-slots, and the UE 104 can determine a starting symbol based on the configured set of possible starting symbols and when the channel is acquired (e.g., when LBT passes or otherwise based on acquisition of the channel via LBT). In one example, the configured set of possible starting symbols can be determined based on an indicated capability of the UE 104.

In one example, to provide multiple LBT opportunities within a slot, UE can be given a first set of configuration for slot based allocation, which may have only one LBT start point per slot. In another example, UE can be given a second set of configuration for non-overlapping mini-slot based allocation (e.g., as shown in resource allocation 900). UE supporting multiple PUSCH per slot with mini-slot capability can support this mode. This naturally has multiple LBT start point per slot corresponding to each mini-slot. One possible issue with this is that in one slot, multiple PUSCH may be used so may have to send multiple UCIs, more DMRS, block multiple HARQ IDs, etc. An implicit understanding, in one example, may be that UE pre-determines whether it uses the slot configuration or mini-slot configuration and performs transmissions accordingly (e.g., use slot configuration to obtain the medium and then switch to mini-slot configuration).

Aspects described herein may also allow for full slot PUSCH transmissions or other transmissions that can span mini-slots (and which may take advantage of parallel PUSCH preparation for various sized transmissions), as shown for example in resource allocation 902, as well as a mix of mini-slot configuration and parallel PUSCH preparation, as shown for example in resource allocation 904. In these examples, the UE 104 can concurrently prepare PUSCH for various transmission lengths that may overlap in time, as described further herein.

For UEs having capability to concurrently prepare multiple overlapping PUSCHs (including full slot and mini-slot), each with length from every starting point of the set of starting points to end of the slot (e.g., as opposed to only non-overlapping and/or fixed length mini-slot transmissions, e.g., as shown in resource allocation 900), it may be more efficient for UE to transmit PUSCH for the full slot starting from the symbol where LBT passes (e.g. as shown in resource allocation 902), as the UE can incur lesser UCI overhead, lesser DMRS overhead, fewer HARQ IDs etc. for the single PUSCH transmission. This can be a UE capability different from UE capability to transmit N PUSCHs in slot, and the UE may indicate the capability (e.g., to the base station) to transmit PUSCH in the full slot as described above and further herein for receiving a set of possible starting points for PUSCH transmission. In an example, when UE prepares all PUSCH associated with a slot before itself, the mini-slot capable UE can prepare two PUSCH that are both 7 symbol long (e.g., non-overlapping mini-slots for 2 starting points in a slot). A UE capable of preparing a parallel full slot PUSCH and a mini-slot PUSCH can prepare two PUSCHs, one is 14 symbol long and another is 7 symbol long (e.g., overlapping full slot (14 symbol) and mini-slot (7 symbol) PUSCHs for 2 starting points in a slot). Transport block (TB) size can be same for both full slot and mini-slot, or can depend on the number of symbols from a starting point to end of the slot (in this example 14 symbols for the first PUSCH and 7 symbols for the second PUSCH). The UE capability for preparing PUSCHs of different lengths in parallel (14 and 7 symbols in this example), can be indicated for rate matching to each of these lengths (e.g., and not for puncturing) to arrive at these lengths. Though only slots where LBT passes are described herein, for subsequent slots, UE can use full slot based transmissions, etc. depending on its processing timelines. Additionally, as described herein, the UEs can support parallel (e.g., concurrent) preparation of multiple instances of uplink communications for transmission based on a set of multiple possible starting points, in some examples.

In this example, in method 700, optionally at Block 704, a capability indication related to a capability of possible starting points for transmitting uplink communications within a slot can be transmitted to a base station. In an aspect, capability indicating component 254, e.g., in conjunction with processor(s) 212, memory 216, transceiver 202, communicating component 242 etc., can transmit, to the base station (e.g., base station 102) the capability indication related to the capability of possible starting points for transmitting uplink communications within the slot. For example, capability indicating component 254 can transmit one or more of a capability (or an indication of a capability) to support one or more of the set of possible starting points within the slot with a transmission length corresponding to each of the set of possible starting points. In this example, there can be an overlap in the possible transmission resources, for which PUSCH is prepared, with different starting points for transmitting the uplink communications (and/or where transmission of each uplink communication is rate matched corresponding to the transmission length), such as shown in resource allocation 902 and/or 904. In one example, transmitting the capability can include transmitting a capability to support full slot transmission from one or more starting points within the slot until end of the slot (e.g., and thus parallel preparation of PUSCH) and/or to support mix of mini-slot and parallel preparation of PUSCH, as described above. In another example a UE capability can include a number of parallel PUSCHs (overlapping) of different lengths (e.g., from different starting points in a slot to end of the slot) that the UE can prepare. For example, the capability for a UE to prepare parallel PUSCHs may be for rate matching to the different lengths (multiple PUSCH preparation) and not for puncturing a single long PUSCH.

In another example, capability indicating component 254 can transmit one or more of a capability (or an indication of a capability) to support at least one of a number of uplink communications that can be transmitted within the slot, a number of instances of uplink communications that can be concurrently prepared for transmission within the slot, a number of PUSCH symbols per slot that can be prepared including the overlapping PUSCHs (e.g., this number can be greater than 14 since the prepared PUSCHs can overlap), or a time for preparing the uplink communications. For example, capability indicating component 254 can transmit the indication in RRC signaling, UCI, etc., which may be based on a request for capability information received from the base station 102, etc.

In this example, in method 800, optionally at Block 804, a capability indication of a capability related to possible starting points for transmitting uplink communications within a slot can be received. In an aspect, capability indicating component 254, e.g., in conjunction with processor(s) 212, memory 216, transceiver 202, communicating component 242 etc., can receive the capability indication of the capability related to possible starting points for uplink communications within the slot. In this example, starting set indicating component 356 can determine the set of possible starting points based on the indicated capability or capabilities.

For example, options/parameters to define UE capability (e.g., the parameters of the capability indication) may include: 1) Number of PUSCH the UE can actually transmit (which may be defined in NR but may be non-overlapping); 2) Number of overlapping PUSCHs the UE can handle for parallel transmission, which may be based on LBT outcome purposes; 3) Number of PUSCH symbols per slot the UE can handle (this can be more than 14 considering some of the PUSCH can have overlapping symbols); or 4) PUSCH preparation time (potentially as function of number of symbols). The PUSCH preparation time can differ from the UL grant to PUSCH time (e.g., PUSCH preparation time may not need to include the DCI decoding time, etc.). In addition, the PUSCH preparation time can indicate how quickly the UE can react to LBT failure. For example, where the UE prepares PUSCH for full slot, if LBT fails, the UE can prepare a new PUSCH to start at symbol 7. In an example, as described, the UE can communicate this capability to gNB so the gNB can configure the UE (and/or the system of communication between the UE and gNB) more efficiently. In another example, if gNB knows UE can handle all LBT points with just one PUSCH, the gNB may not need to configure as many HARQ IDs for configured grant (CG) transmissions. In yet another example, the set of possible starting points can be a UE implementation choice.

In method 700, optionally at Block 706, multiple instances of the uplink communications can be prepared for each of the set of possible starting points for the uplink communications within the slot. In an aspect, communicating component 242, e.g., in conjunction with processor(s) 212, memory 216, transceiver 202, etc., can prepare, for each of the set of possible starting points for the uplink communications within the slot, multiple instances of the uplink communications. For example, communicating component 242 can concurrently prepare the multiple instances. As described, communicating component 242 can prepare the multiple instances based on the set of possible starting points as determined by the UE 104 or as otherwise indicated by the base station 102 (based on capability indication or otherwise). For example, in FIG. 9, the possible starting points can correspond to (at least a portion of) the starting symbols in each mini-slot. Thus, for example, as shown for resource allocation 902, communicating component 242 can prepare instances of overlapping uplink communications for the full slot PUSCH, mini-slot 1, mini-slot 2, and mini-slot 3, depending on the possible starting points and the corresponding transmission length. For resource allocation 904 (e.g., and depending on the capability of the UE 104), communicating component 242 can prepare instances of two different uplink transmissions within the slot, which may include overlapping uplink communications for the mini-slot 1 and mini-slot 3, mini-slot 2 and mini-slot 3, or mini-slot 2 and mini-slot 4. Additional examples of preparing instances of uplink communications are also described in FIG. 10 below.

In method 700, at Block 708, acquisition of a channel can be detected for transmitting uplink communications at one of the set of possible starting points. In an aspect, communicating component 242, e.g., in conjunction with processor(s) 212, memory 216, transceiver 202, etc., can detect acquisition of the channel for transmitting uplink communications at one of the set of possible starting points. For example, communicating component 242 can detect acquisition of the channel based on a successful LBT procedure. In this example, communicating component 242 can observe the channel to determine if other devices are communicating over the channel and/or can transmit a message to acquire the channel when it is determined that the channel is available, etc.

In method 700, at Block 710, a set of resources to use for transmitting a data packet within the slot can be selected. In an aspect, communicating component 242, e.g., in conjunction with processor(s) 212, memory 216, transceiver 202, etc., can select the set of resources to use for transmitting the data packet within the slot. For example, communicating component 242 can select the set of resources based on the set of possible starting points and based on acquiring the channel. For example, communicating component 242 can select the set of resources to start at the first starting point after acquiring the channel and continuing to the end of the corresponding mini-slot or slot. For example, mini-slot capable UEs can use mini-slot length for the data packet. A UE able to prepare overlapping PUSCH (e.g., concurrently prepare PUSCH of different sizes) and/or able to prepare PUSCH faster, as described above and further herein, may choose lengths longer than the mini-slot, as shown in resource allocations 902, 904, for example.

In one example, communicating component 242 can select the set of resources for transmitting full slot PUSCH from the starting point and/or for transmitting based on a mix of mini-slot and parallel PUSCH. In an example, communicating component 242 can also select an ending point to be used for transmission of the data packet (e.g., an end of a mini-slot, an end of the slot, or another symbol within the slot). In another example, communicating component 242 may select the set of resources when transmitting only mini-slot as well (e.g., as shown in resource allocation

900). In this example, communicating component 242 can select resources for mini-slot transmission even with no parallel PUSCH preparation capability. An example is shown in FIG. 10.

Figure 10:
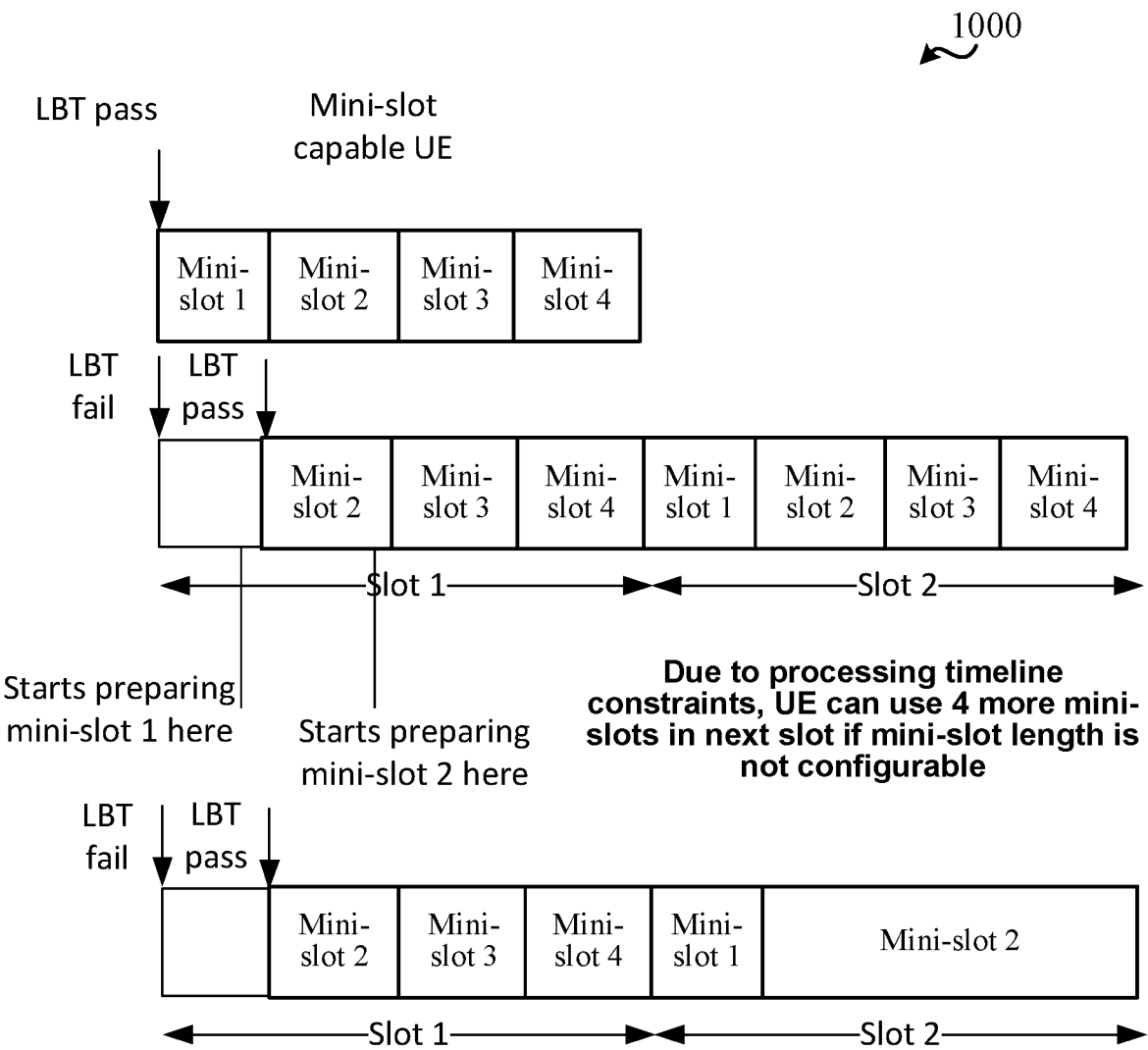
FIG. 10 illustrates an example of resource allocations for mini-slot capable user equipment, in accordance with various aspects of the present disclosure.

FIG. 10 illustrates an example of a resource allocation 1000 of mini-slots where various mini-slots are used to transmit PUSCH in a first slot (Slot 1) because of ambiguity in starting point due to LBT. In a second slot (Slot 2) also, if the LBT passes in the middle of Slot 1, due to processing timeline constraints the UE may need to use mini-slots (though it could have used one full slot). In some examples some HARQ IDs may not be usable in Slot 2 as they were used previously (e.g. for mini-slots in Slot 1) and UE may be waiting for feedback from gNB. In this example, resource indicating component 252 may determine to switch from 4 mini-slot mode per slot to 2 mini-slot mode per slot (e.g. as shown for Slot 2 in the second example in 1000) to reduce the number of HARQ IDs needed.

In method 700, optionally at Block 712, UCI including an indication of a size of the set of resources to use for transmitting the data packet and the UCI within the slot can be generated. In an aspect, resource indicating component 252, e.g., in conjunction with processor(s) 212, memory 216, transceiver 202, communicating component 242, etc., can generate UCI including the indication of the size of the set of resources to use for transmitting the data packet and the UCI within the slot.

In method 700, at Block 714, the data packet and/or UCI can be transmitted to a base station on the selected set of resources. In an aspect, communicating component 242, e.g., in conjunction with processor(s) 212, memory 216, transceiver 202, etc., can transmit the data packet and/or the UCI to the base station (e.g., base station 102) on the selected set of resources. In an example, communicating component 242 can transmit the data packet from the starting point using rate matching. For example, communicating component 242 can map at least the UCI (which may include CG-UCI and/or may have a HARQ-ACK or redundancy version, etc.) assuming a minimum number of allowed symbols in the selected resources. In one example, communicating component 242 can map CG-UCI based on all used symbols in the set of resources also possibly at expense of increased complexity at gNB (e.g., to perform blind decoding for different lengths). Communicating component 242 can also limit mapping of other UCI (e.g., within the slot) to the same number (minimum guaranteed) or can use more symbols as the other UCIs may be decoded after CG-UCI is decoded.

In method 800, at Block 806, UCI including an indication of a set of resources to use for transmitting uplink communications within a slot can be received. In an aspect, resource determining component 352, e.g., in conjunction with processor(s) 312, memory 316, transceiver 302, configuring component 342, etc., can receive the UCI including the indication of the set of resources to use for transmitting uplink communications within the slot. For example, the UCI can indicate a size or length of the resources, a starting point, etc., as described above.

In method 800, at Block 808, uplink communications received within the slot can be processed based on the indication of the set of resources. In an aspect, configuring component 342, e.g., in conjunction with processor(s) 312, memory 316, transceiver 302, etc., can process the uplink communications received in the slot based on the indication of the set of resources. For example, configuring component 342 can determine the resources over which the uplink communications are transmitted based on the size or length of resources, the starting point, etc., as indicated in the UCI. In one example, the UCI can include UCI transmitted for each PUSCH in one or more slots or mini-slots (e.g., as shown in resource allocations 902, 904), etc.

Figure 11:
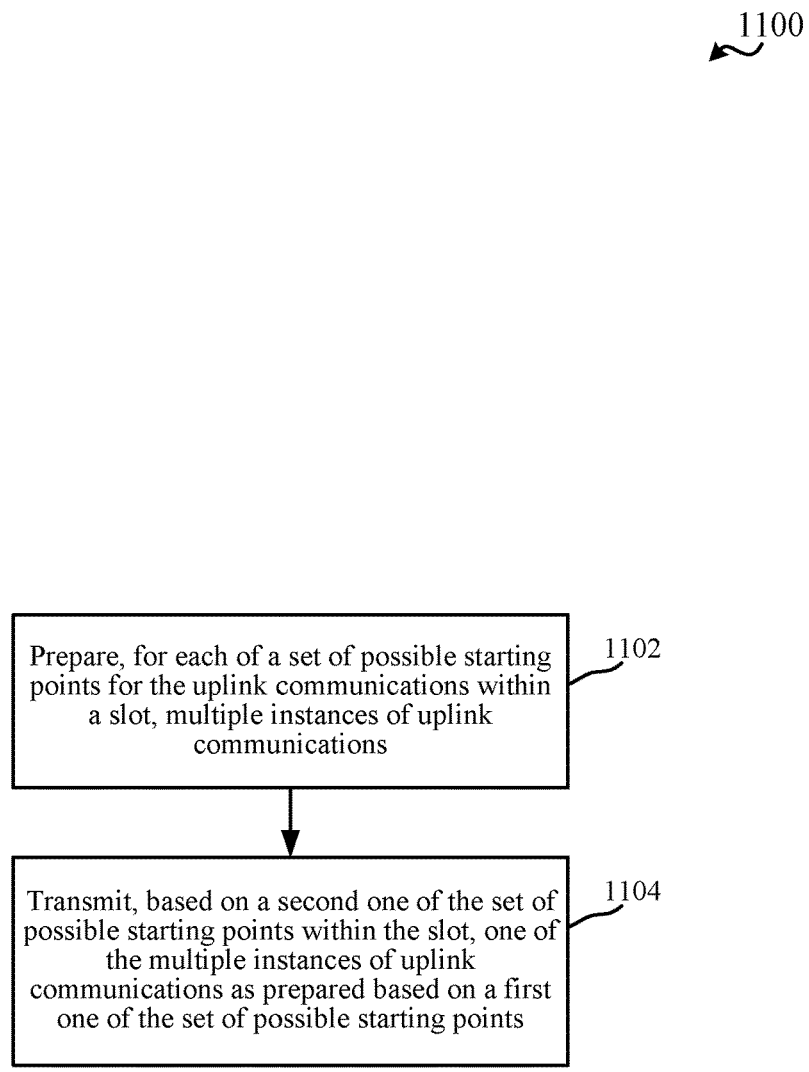
FIG. 11 is a flow chart illustrating an example of a method for preparing multiple instances of uplink communications for possible transmission, in accordance with various aspects of the present disclosure.

FIG. 11 illustrates a flow chart of an example of a method 1100 for performing concurrent preparation of uplink communications in accordance with aspects described herein. In an example, a UE 104 can perform the functions described in method 1100 using one or more of the components described in FIGS. 1 and 2.

In method 1100, at Block 1102, for each of a set of possible starting points for uplink communications within a slot, multiple instances of uplink communications can be prepared. In an aspect, communicating component 242, e.g., in conjunction with processor(s) 212, memory 216, transceiver 202, etc., can prepare, for each of the set of possible starting points for the uplink communications within the slot, the multiple instances of uplink communications. For example, communicating component 242 can determine the set of possible starting points based on a configuration from the base station (which may be based on capability indicated by the UE), based on capability or preference determined at the UE 104, etc. For example, the instances of the uplink communications can correspond to the multiple possible starting points and/or corresponding sizes or lengths for the communications (e.g., as illustrated in resource allocations 902, 904). Communicating component 242 can concurrently prepare the multiple instances to save processing time.

In one specific example, in method 1100, at Block 1104, one of the multiple instances of uplink communications as prepared based on a first one of the set of possible starting points can be transmitted based on a second one of the set of possible starting points within the slot. In an aspect, communicating component 242, e.g., in conjunction with processor(s) 212, memory 216, transceiver 202, etc., can transmit, based on the second one of the set of possible starting points within the slot, one of the multiple instances of uplink communications as prepared based on the first one of the set of possible starting points. For example, communicating component 242 can transmit the one of the multiple instances based on determining that the first and second ones of the set of possible starting points correspond to resources of the same size or length. For example, referring to resource allocation 904, communicating component 242 can possibly transmit mini-slot 1 where mini-slot 2 is shown where the first two LBTs fail and the third LBT passes, which may be based on determining that the mini-slots 1 and 2 are of the same size or length.

In an example, in a case of mix of mini-slot and parallel PUSCH preparation, as shown in resource allocation 904 for example, communicating component 242 can generate PUSCH Tx waveform to be position independent (e.g., DMRS positions and/or scrambling can be position independent, data scrambling can be position independent, UCI multiplexing can be position independent, etc.), which can refer to the PUSCH Tx waveform ability to be transmitted at substantially any of the starting points. This can allow for reusing PUSCH prepared for mini-slot 1 for mini-slot 2 as well. For example, UCI multiplexing can depend on which symbols it falls on so this can be updated so that UCI multiplexing happens independent of the mini-slot position. In one example, UCI can only be included if it overlaps in first shift position. PUSCH can be dropped when UCI present or UCI can be postponed otherwise. If PUSCH preparation time is only 4 symbols and mini-slot 1 length is 7 symbols, for example, mini-slot 2 and mini-slot 4 may not need to be prepared before LBT—e.g., they can be prepared based on LBT outcome. gNB can have similar behavior.

Figure 12:
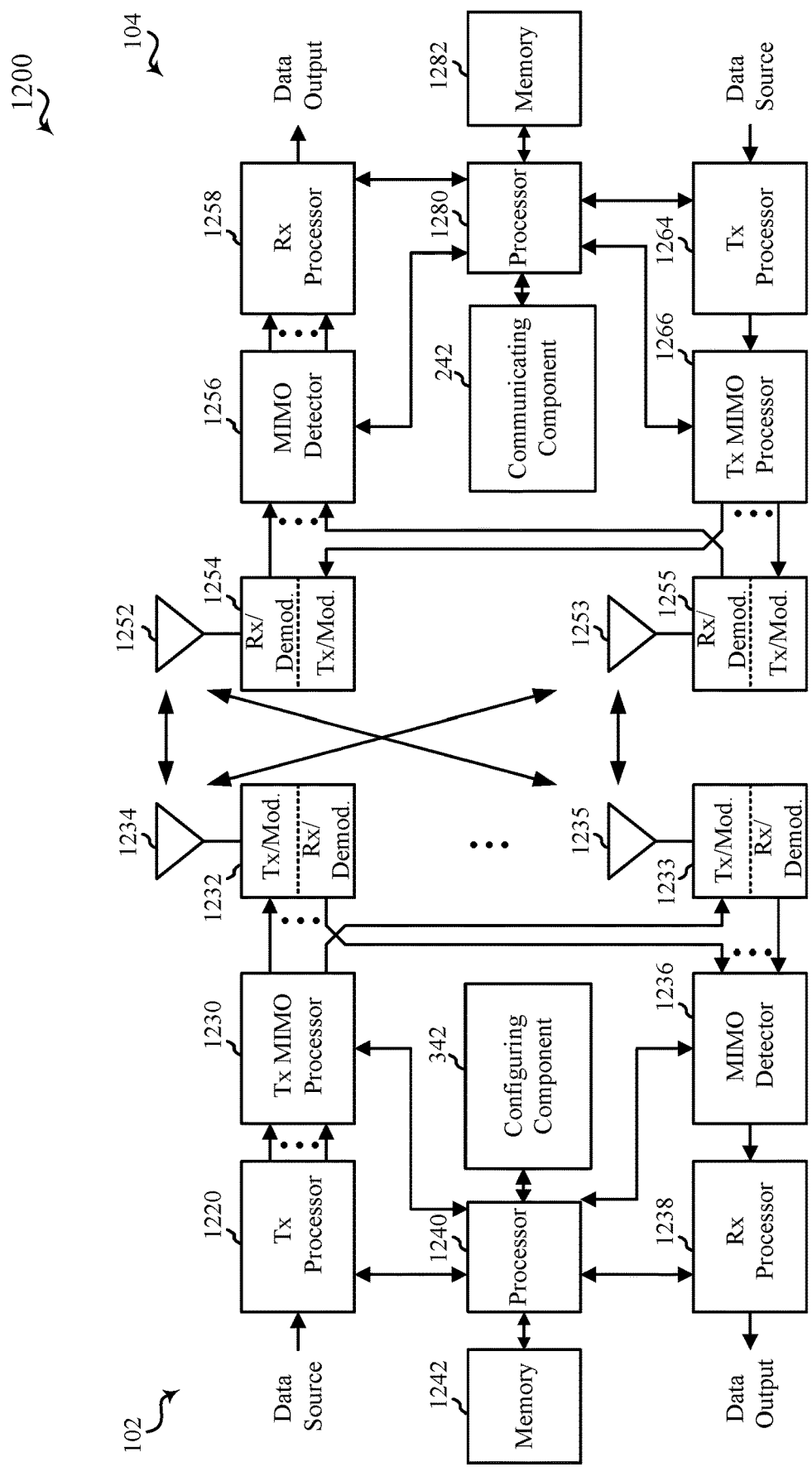
FIG. 12 is a block diagram illustrating an example of a MIMO communication system including a base station and a UE, in accordance with various aspects of the present disclosure.

FIG. 12 is a block diagram of a MIMO communication system 1200 including a base station 102 and a UE 104. The MIMO communication system 1200 may illustrate aspects of the wireless communication access network 100 described with reference to FIG. 1. The base station 102 may be an example of aspects of the base station 102 described with reference to FIG. 1. The base station 102 may be equipped with antennas 1234 and 1235, and the UE 104 may be equipped with antennas 1252 and 1253. In the MIMO communication system 1200, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 1220 may receive data from a data source. The transmit processor 1220 may process the data. The transmit processor 1220 may also generate control symbols or reference symbols. A transmit MIMO processor 1230 may perform spatial processing (e.g., precoding) on data symbols, control symbols, or reference symbols, if applicable, and may provide output symbol streams to the transmit modulator/demodulators 1232 and 1233. Each modulator/demodulator 1232 through 1233 may process a respective output symbol stream (e.g., for OFDM, etc.) to obtain an output sample stream. Each modulator/demodulator 1232 through 1233 may further process (e.g., convert to analog, amplify, filter, and upconvert) the output sample stream to obtain a DL signal. In one example, DL signals from modulator/demodulators 1232 and 1233 may be transmitted via the antennas 1234 and 1235, respectively.

The UE 104 may be an example of aspects of the UEs 104 described with reference to FIGS. 1-2. At the UE 104, the UE antennas 1252 and 1253 may receive the DL signals from the base station 102 and may provide the received signals to the modulator/demodulators 1254 and 1255, respectively. Each modulator/demodulator 1254 through 1255 may condition (e.g., filter, amplify, downconvert, and digitize) a respective received signal to obtain input samples. Each modulator/demodulator 1254 through 1255 may further process the input samples (e.g., for OFDM, etc.) to obtain received symbols. A MIMO detector 1256 may obtain received symbols from the modulator/demodulators 1254 and 1255, perform MIMO detection on the received symbols, if applicable, and provide detected symbols. A receive (Rx) processor 1258 may process (e.g., demodulate, deinterleave, and decode) the detected symbols, providing decoded data for the UE 104 to a data output, and provide decoded control information to a processor 1280, or memory 1282.

The processor 1280 may in some cases execute stored instructions to instantiate a communicating component 242 (see e.g., FIGS. 1 and 2).

On the uplink (UL), at the UE 104, a transmit processor 1264 may receive and process data from a data source. The transmit processor 1264 may also generate reference symbols for a reference signal. The symbols from the transmit processor 1264 may be precoded by a transmit MIMO processor 1266 if applicable, further processed by the modulator/demodulators 1254 and 1255 (e.g., for SC-FDMA, etc.), and be transmitted to the base station 102 in accordance with the communication parameters received from the base station 102. At the base station 102, the UL signals from the UE 104 may be received by the antennas 1234 and 1235, processed by the modulator/demodulators 1232 and 1233, detected by a MIMO detector 1236 if applicable, and further processed by a receive processor 1238. The receive processor 1238 may provide decoded data to a data output and to the processor 1240 or memory 1242.

The processor 1240 may in some cases execute stored instructions to instantiate a configuring component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 1200. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 1200.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

In the following, an overview of further examples is provided:

1. A method for wireless communication, comprising:
acquiring a channel for transmitting communications in a first direction;
generating control information including an indication of a set of resources available to use for transmitting communications in a second direction while the channel is acquired; and
transmitting the control information in a first occasion while the channel is acquired.

2. The method of example 1 wherein the channel is acquired using a listen-before-talk (LBT) procedure.

3. The method of any of examples 1 or 2, wherein the first direction is uplink and the second direction is downlink, and further comprising transmitting, to a base station, in a subsequent occasion while the channel is acquired, an update of the set of resources available to use for transmitting communications in the second direction while the channel is acquired.

4. The method of example 3, wherein the updated set of resources includes the previously indicated set of resources available to use for transmitting downlink communications while the channel is acquired.

5. The method of any of examples 1 to 4, wherein the first direction is downlink and the second direction is uplink, and further comprising transmitting, to a user equipment, in a subsequent occasion while the channel is acquired, an update of the set of resources available to use for transmitting communications in the second direction while the channel is acquired.

6. The method of example 5, wherein the updated set of resources includes the previously indicated set of resources available to use for transmitting uplink communications while the channel is acquired.

7. A method for wireless communication, comprising:
receiving a starting indication of a set of possible starting points within a slot for transmitting uplink communications;
detecting acquisition of a channel for transmitting uplink communications at a starting point in the set of possible starting points;
selecting a set of resources to use for transmitting a data packet within the slot; and
transmitting the data packet to a base station on the selected set of resources.

8. The method of example 7, wherein the data packet corresponds to one physical uplink shared channel (PUSCH).

9. The method of any of examples 7 or 8, wherein selecting the set of resources comprises selecting an ending point to be used for transmission of the data packet, and wherein the set of resources comprises resources between the starting point where the channel is acquired and the selected ending point.

10. The method of example 9, wherein the ending point is selected based on one or more of other starting points in the set of possible starting points and the end of the slot.

11. The method of any of examples 7 to 10, further comprising generating uplink control information (UCI) including an indication of the set of resources to use for transmitting the data packet and the UCI within the slot.

12. The method of example 11, wherein the indication of the set of resources includes indicating a number of symbols used for the data packet, and wherein the UCI is mapped at least one of using a minimum number of symbols allowed to be used for the starting point or using the number of symbols used for the data packet.

13. The method of example 12, where in the UCI is a configured grant UCI that includes one or more of hybrid automatic repeat/request (HARQ) identifier or a redundancy version.

14. The method of any of examples 11 to 13, further comprising mapping a different UCI that is sent along with the data packet that is mapped using a number of symbols used for the data packet.

15. The method of example 14, wherein the UCI includes one or more of hybrid automatic repeat/request (HARQ) acknowledgment feedback or channel state information (CSI) feedback.

16. The method of any of examples 7 to 15, further comprising concurrently preparing multiple instances of uplink communications including the data packet, wherein each of the multiple instances is based on a different one of the set of possible starting points within the slot.

17. The method of any of examples 7 to 16, further comprising:
indicating, to the base station, a capability to support one or more of the set of possible starting points within the slot with a transmission length corresponding to each of the set of possible starting points where there is an overlap in transmission resources with different starting points for transmitting the uplink communications, wherein receiving the starting indication is based on indicating the capability.

18. The method of example 17, wherein transmission of each uplink communication is rate matched corresponding to the transmission length.

19. The method of any of examples 7 to 18, further comprising:
indicating, to the base station, a capability of at least one of a number of uplink communications that can be transmitted within the slot, a number of instances of uplink communications that can be concurrently prepared for transmission within the slot, a number of symbols within the slot over which uplink communications can be transmitted, or a time for preparing the uplink communications, wherein receiving the starting indication is based on indicating the capability.

20. A method for wireless communications, comprising:
preparing, for each of a set of possible starting points for uplink communications within a slot, multiple instances of the uplink communications; and
transmitting, based on a second one of the set of possible starting points, one of the multiple instances of the uplink communications as prepared based on a first one of the set of possible starting points.

21. The method of example 20, wherein preparing one of the multiple instances of uplink communications for at least the first one of the set of possible starting points comprises preparing the one of the multiple instances of uplink communications to be waveform position independent.

22. The method of example 21, wherein preparing the one of the multiple instances of uplink communications to be waveform position independent comprises selecting at least one of scrambling for a demodulation reference signal (DMRS), scrambling for uplink data, or multiplexing of UCI to be waveform position independent.

23. The method of any of examples 21 or 22, wherein preparing the one of the multiple instances of uplink communications to be waveform position independent comprises multiplexing the UCI independently of a position of a mini-slot within the slot.

24. The method of any of examples 20 to 23, further comprising determining, based on when channel acquisition is detected within the slot, the set of possible starting points within the slot for which to prepare the multiple instances of the uplink communications.

25. A method for wireless communication, comprising:
receiving uplink control information (UCI) including an indication of a set of resources used for transmitting uplink communications within a mini-slot;
receiving uplink communications within the mini-slot; and
processing a data packet of the uplink communications based on the indication of the set of resources.

26. The method of example 25, wherein the indication of the set of resources includes indicating a number of symbols used for the data packet, and wherein the UCI is mapped at least one of using a minimum number of symbols allowed to be used for a starting point or using the number of symbols used for the data packet.

27. The method of any of examples 25 or 26, further comprising receiving a different UCI that is sent along with the data packet that is mapped using a number of symbols used for the data packet.

28. The method of any of examples 25 to 27, further comprising transmitting a starting indication of a set of possible starting points within a slot, after detecting channel acquisition, for transmitting the uplink communications.

29. The method of any of examples 25 to 28, further comprising:
receiving a capability to support one or more of a set of possible starting points within the slot with a transmission length corresponding to each of the set of possible starting points where there is an overlap in transmission resources with different starting points for transmitting the uplink communications; and
transmitting, based on the capability, a starting indication of the set of possible starting points within the slot, after detecting channel acquisition, for transmitting the uplink communications.

30. The method of any of examples 25 to 29, further comprising:
receiving a capability indication of a capability of at least one of a number of uplink communications that can be transmitted within the mini-slot, a number of instances of uplink communications that can be concurrently prepared for transmission within the mini-slot, a number of symbols within the mini-slot over which uplink communications can be transmitted, or a time for preparing the uplink communications; and
transmitting, based on the capability indication, a starting indication of a set of possible starting points within the slot, after detecting channel acquisition, for transmitting the uplink communications.

31. An apparatus for wireless communication, comprising:
a transceiver;
a memory configured to store instructions; and
one or more processors communicatively coupled with the transceiver and the memory, wherein the one or more processors are configured to execute the instructions to perform the operations of one or more methods in any of examples 1 to 30.

32. An apparatus for wireless communication, comprising means for performing the operations of one or more methods in any of examples 1 to 30.

33. A computer-readable medium, comprising code executable by one or more processors to perform the operations of one or more methods in any of examples 1 to 30.

What is claimed is:

1. A method for wireless communication, comprising:
   receiving, from a node in a first direction and during a first occasion in a channel occupancy time (COT), control information including an indication of a set of resources available to use for transmitting communications in a second direction and during the COT while the node has acquired a channel;
   receiving, during the COT, an updated set of resources available to use for transmitting communications in the second direction and during a second occasion of the COT while the node has acquired the channel; and
   transmitting, in the set of resources based on receiving the control information or in the updated set of resources based on receiving the updated set of resources, communications to one or more nodes in the second direction during the COT.

2. The method of claim 1, wherein the updated set of resources includes the set of resources and additional resources during the second occasion while the node has acquired the channel, and wherein transmitting the communications is in the updated set of resources.

3. The method of claim 1, wherein the updated set of resources is reduced from the set of resources, and wherein transmitting the communications is in the set of resources.

4. The method of claim 3, further comprising discarding an update received indicating the updated set of resources.

5. The method of claim 1, wherein the first direction is downlink and the second direction is uplink.

6. The method of claim 1, wherein the first direction is uplink and the second direction is downlink.

7. The method of claim 1, wherein the node acquires the channel using a listen-before-talk (LBT) procedure.

8. The method of claim 7, wherein the set of resources are within a channel occupancy time related to acquiring the channel using the LBT procedure.

9. A method for wireless communication by an apparatus, comprising:
   acquiring a channel for transmitting communications in a first direction during a channel occupancy time (COT);
   generating control information including an indication of a set of resources available to use for transmitting communications in a second direction during the COT while the channel is acquired;
   transmitting the control information in a first occasion during the COT while the channel is acquired; and
   transmitting, during the COT while the channel is acquired, an update of the set of resources available to use for transmitting communications in the second direction during the COT while the channel is acquired.

10. The method of claim 9, wherein the channel is acquired using a listen-before-talk (LBT) procedure.

11. The method of claim 10, wherein the set of resources are within a channel occupancy time related to acquiring the channel using the LBT procedure.

12. The method of claim 9, wherein the apparatus is a user equipment (UE), wherein the first direction is uplink and the second direction is downlink, and wherein transmitting the update of the set of resources includes transmitting, to a base station, the update of the set of resources.

13. The method of claim 12, wherein the update of the set of resources includes the set of resources available to use for transmitting downlink communications while the channel is acquired.

14. The method of claim 9, wherein the apparatus is a base station, wherein the first direction is downlink and the second direction is uplink, and wherein transmitting the update of the set of resources includes transmitting, to a user equipment, the update of the set of resources.

15. The method of claim 14, wherein the update of the set of resources includes the set of resources available to use for transmitting uplink communications while the channel is acquired.

16. An apparatus for wireless communication, comprising:
   a transceiver;
   a memory configured to store instructions; and
   one or more processors communicatively coupled with the transceiver and the memory, wherein the one or more processors are configured to:
     receive, from a node in a first direction and during a first occasion in a channel occupancy time (COT), control information including an indication of a set of resources available to use for transmitting communications in a second direction and during the COT while the node has acquired a channel;
     receive, during the COT, an updated set of resources available to use for transmitting communications in the second direction and during a second occasion of the COT while the node has acquired the channel; and
     transmit, in the set of resources based on receiving the control information or in the updated set of resources based on receiving the updated set of resources, communications to one or more nodes in the second direction during the COT.

17. The apparatus of claim 16, wherein the updated set of resources includes the set of resources and additional resources during the second occasion while the node has acquired the channel, and wherein the one or more processors are configured to transmit the communications in the updated set of resources.

18. The apparatus of claim 16, wherein the updated set of resources is reduced from the set of resources, and wherein the one or more processors are configured to transmit the communications in the set of resources.

19. The apparatus of claim 18, wherein the one or more processors are further configured to discard an update received indicating the updated set of resources.

20. The apparatus of claim 16, wherein the first direction is downlink and the second direction is uplink.

21. The apparatus of claim 16, wherein the first direction is uplink and the second direction is downlink.

22. The apparatus of claim 16, wherein the node acquires the channel using a listen-before-talk (LBT) procedure.

23. The apparatus of claim 22, wherein the set of resources are within a channel occupancy time related to acquiring the channel using the LBT procedure.

24. An apparatus for wireless communication, comprising:
   a transceiver;
   a memory configured to store instructions; and
   one or more processors communicatively coupled with the transceiver and the memory, wherein the one or more processors are configured to:
     acquire a channel for transmitting communications in a first direction during a channel occupancy time (COT);
     generate control information including an indication of a set of resources available to use for transmitting communications in a second direction during the COT while the channel is acquired;
     transmit the control information in a first occasion during the COT while the channel is acquired; and transmit, during the COT while the channel is acquired, an update of the set of resources available to use for transmitting communications in the second direction during the COT while the channel is acquired.

25. The apparatus of claim 24, wherein the channel is acquired using a listen-before-talk (LBT) procedure.

26. The apparatus of claim 25, wherein the set of resources are within a channel occupancy time related to acquiring the channel using the LBT procedure.

27. The apparatus of claim 24, wherein the apparatus is a user equipment (UE), wherein the first direction is uplink and the second direction is downlink, and wherein the one or more processors are configured to transmit, to a base station, the update of the set of resources.

28. The apparatus of claim 27, wherein the update of the set of resources includes the set of resources available to use for transmitting downlink communications while the channel is acquired.

29. The apparatus of claim 24, wherein the apparatus is a base station, wherein the first direction is downlink and the second direction is uplink, and wherein the one or more processors are configured to transmit, to a user equipment, the update of the set of resources.

30. The apparatus of claim 29, wherein the update of the set of resources includes the set of resources available to use for transmitting uplink communications while the channel is acquired.

* * * * *